United States Patent
Godard et al.

(12)

(10) Patent No.: US 9,785,441 B2
(45) Date of Patent: Oct. 10, 2017

(54) COMPUTER PROCESSOR EMPLOYING INSTRUCTIONS WITH ELIDED NOP OPERATIONS

(71) Applicant: Mill Computing, Inc., Palo Alto, CA (US)

(72) Inventors: Roger Rawson Godard, East Palo Alto, CA (US); Arthur David Kahlich, Sunnyvale, CA (US); David Arthur Yost, Los Altos, CA (US)

(73) Assignee: Mill Computing, Inc., Palo Alto, CA (US)

( * ) Notice: Subject to any disclaimer, the term of this patent is extended or adjusted under 35 U.S.C. 154(b) by 439 days.

(21) Appl. No.: 14/290,293

(22) Filed: May 29, 2014

(65) Prior Publication Data

US 2015/0347143 A1 Dec. 3, 2015

(51) Int. Cl.
*G06F 9/30* (2006.01)
*G06F 9/38* (2006.01)

(52) U.S. Cl.
CPC ...... *G06F 9/30149* (2013.01); *G06F 9/30079* (2013.01); *G06F 9/3836* (2013.01)

(58) Field of Classification Search
CPC ................................................. G06F 9/30149
See application file for complete search history.

(56) References Cited

U.S. PATENT DOCUMENTS

| | | | |
|---|---|---|---|
| 5,604,877 A | 2/1997 | Hoyt et al. | |
| 5,852,729 A * | 12/1998 | Limberis | G06F 9/32 704/258 |
| 6,170,051 B1 * | 1/2001 | Dowling | G06F 9/3001 712/200 |
| 6,304,962 B1 | 10/2001 | Nair | |
| 7,818,542 B2 | 10/2010 | Shen et al. | |

(Continued)

OTHER PUBLICATIONS

Decoupled Access/Execute Computer Architectures, James E. Smith, 0149-7111/82/0000/0112$00.75 © 1982 IEEE, pp. 112-119.

(Continued)

*Primary Examiner* — Aimee Li
*Assistant Examiner* — William Nguyen
(74) *Attorney, Agent, or Firm* — Gordon & Jacobson, P.C.

(57) ABSTRACT

A computer processor that operates on distinct first and second instruction streams that have a predefined timed semantic relationship. At least one of the first and second instruction streams includes variable-length instructions having a header and associated bundle bounded by a head end and a tail end. An alignment hole within the bundle encodes information representing at least one nop operation. The computer processor includes first and second multi-stage instruction processing components configured to process in parallel the first and second instruction streams. At least one of the first and second multi-stage instruction processing components includes an instruction buffer operably coupled to a decode stage. The decode stage is configured to process a variable-length instruction by isolating and interpreting the alignment hole of the variable length instruction in order to initiate zero or more nop operations that follow the timed semantic relationship between the first and second instruction streams.

24 Claims, 4 Drawing Sheets

(56) References Cited

U.S. PATENT DOCUMENTS 8,402,252 B2    3/2013  Coke et al.
2006/0026577 A1*  2/2006  Dinechin .................. G06F 8/65
                                                717/148

OTHER PUBLICATIONS

The Heads and Tails Instruction Format, Heidi Pan and Krste Asanovic, MIT Laboratory for Computer Science, Mar. 2003, pp. 131-132.

Heads and Tails: A Variable-Length Instruction Format Supporting Parallel Fetch and Decode, Heidi Pan and Krste Asanovic, Cases'01, Nov. 16-17, 2001, ACM 1581133995/01/0011.

Software Pipelining and Superblock Scheduling: Compilation Techniques for VLIW Machines, Hewlett Packard, Meng Lee et al., Computer Systems Laboratory, HPL-92-78, Jun. 1992, Title page and pp. 1-16.

Sound and Vision: A Technical Overview of the Emotion Engine, Jon Stokes, Feb. 16, 2000, ars Technica Gear & Gadgets, available at http://arstechnica.com/gadgets/2000/02/ee/, pp. 1-16.

* cited by examiner

COMPUTER PROCESSOR EMPLOYING INSTRUCTIONS WITH ELIDED NOP OPERATIONS

CROSS-REFERENCE TO RELATED APPLICATIONS

The present disclosure is related to i) U.S. patent application Ser. No. 14/290,108 entitled "Computer Processor Employing Split-stream Encoding," and ii) U.S. patent application Ser. No. 14/290,161, entitled "Computer Processor Employing Double-Ended Instruction Decoding," both applications commonly owned by the assignee of the present application and filed concurrently herewith and here incorporated by reference in their entireties.

BACKGROUND

1. Field

The present disclosure relates to computer processors.

2. Related Art

A computer processor (or central processing unit or CPU) executes a sequence of instructions, typically obtained from main memory, which are executed in positional order except when redirected by a branch, jump, call, or similar control-flow operation. The order is important because there are often semantic dependencies between pairs of instructions and the machine state would be different if the instructions were executed in a different order; that is, instruction execution is not commutative. However, strict order is not always required for a particular pair of instructions, and an important class of CPU architectures (called out-of-order execution (OOO) machines) detects the presence of semantic dependencies and reorders the execution of instructions in ways that preserve semantics while improving execution performance. Nevertheless, for nearly all CPU architectures, the original program instruction order is used as an implicit specification of the intended program semantics, whether reordered later or not.

There is little to be gained by reordering when the CPU can execute only one instruction at a time. After all, if every instruction operation has to be executed individually then any ordering should take as long to execute as any other. However, in the quest for CPU performance, computer designers have created CPUs that are capable of performing more than one operation simultaneously, in parallel. Clearly, if the program calls for two instructions to be executed in sequence, but they are actually executed simultaneously, then any semantic dependency between them will be violated. An OOO-architecture CPU can detect when two instructions, while sequential in the program, are independent and thus can be executed simultaneously. This permits the CPU to perform both instructions in parallel, shortening the total execution time of the program. The hardware to perform OOO reordering is large, difficult to design, and costly in chip area, power, and clock rate impact. Nevertheless it can yield significant gains when the program instruction set interface specifies a single, nominally sequential, instruction stream. However, there are ways to obtain parallel execution by using a different approach to specifying instruction semantics.

One common approach to obtain parallel execution is referred to as "multi-threading," where the program is specified not as a single sequential stream of instructions, but as several such streams. Sequential semantics are enforced within any single stream of instructions, but the streams themselves are considered to be independent and instructions between streams can be executed in any order except for certain specialized instructions which serve to synchronize the streams. Each stream may be executed by its own sub-CPU or pipeline, or the streams may be interleaved on a single CPU such that each uses resources left idle by the others.

In another approach to obtain parallel execution, typified by Very Long Instruction Word (VLIW) architectures, there is only one instruction stream, but each instruction may have several operations which are executed in parallel. In essence, a VLIW sees multiple operation streams rather than multiple instruction streams, where operations from multiple operation streams are concatenated together to form a single instruction in a single instruction stream. Each position at which an operation can reside within the instruction is called a slot. Because the operations of each slot are in a shared instruction, the multiple operations streams are synchronized at every cycle and advance in lock step. Consequently, an operation executed in a given cycle may be semantically dependent on any operation executed earlier and operations that are executed in later cycles may be semantically dependent on it, but operations (from a single instruction) executed in the same cycle cannot be dependent on each other. So long as there are at least as many independent operations in a cycle as there are slots then all slots can be kept busy; if not then some slots must remain idle. Code generation software such as compilers analyze the program and assign individual operations to the slots so as to maximize performance. This task, called static scheduling, is similar to what an OOO machine does in dynamic scheduling hardware during execution. But because it is done once, in advance, and by software able to statically analyze and optimize future execution, the result is a much cheaper CPU and generally better performance for a large class of programs.

The instruction and operation streams described here are abstract notions, which must be encoded as a sequence of primitive operations defined by bits in memory that are fetched and executed by the CPU. The encodings used by different CPU architectures vary greatly from each other, but all seek to balance ease of interpretation by hardware decode machinery against compactness of representation. In most architectures, the instructions are intended to be executed in a particular order as an instruction stream, where the execution order is usually determined by the address order of the instructions in memory but may be changed as a consequence of the execution of flow of control operations in the instruction stream as described above with respect to OOO machines.

Broadly, there are two sorts of encodings used for instructions: fixed-length encodings and variable-length encodings. In a fixed-length encoding, each instruction uses a single fixed number of bits for its representation, for example 32 bits. In a variable-length encoding, different instructions use different bit-lengths where the bit-length for a particular instruction is typically selected by minimizing the number of bits required to convey the semantics of that particular instruction. Thus, some instructions may be 8 bits in length, others 16 bits, 56 bits or whatever. The fixed-length encoding approach is commonly associated with RISC (Reduced Instruction Set Computer) designs typified by the SPARC instruction set architecture, while the variable-length encoding approach is commonly associated with CISC (Complex Instruction Set Computer) designs typified by x86 instruction set architectures.

In general, fixed-length encodings are relatively easy to decode, and it is especially easy to decode several operations simultaneously in parallel because it is known a priori where in memory each operation starts. Parallel decode reads in a block of operations, breaks them at operation boundaries, and gives each of them to independent decoders. However, fixed length encodings are not compact, because the semantics of many kinds of operation can be represented in fewer bits than the fixed length. Other kinds of operation need more bits than the encoding length and so a single logical operation must be represented awkwardly as two or more of the fixed length operation.

By contrast, variable-length encodings tend to be quite compact, which is economical of memory space and reduces the load on memory pathways arising from instruction fetch. However, the decode machinery does not know the length of a particular variable-length operation until it has examined it, a process called parsing the operation. This is a problem for modern architectures that execute several operations in parallel. While the decode hardware that parses operations can fetch a block of memory that contains several operations, it cannot know where any operation after the first begins until after it has parsed all prior operations. This serializes operation parse, whereas the fixed length encodings can be easily parsed in parallel. Schemes for parallel decode of variable length operations (despite the serial parse) exist, but are difficult to realize and very expensive in hardware and power consumption.

Furthermore, there are two prior art approaches to instruction semantics. In one approach, typically referred to as sequential semantics, each instruction presumes that all prior instructions in the instruction stream have been executed to completion before the present instruction begins, and so all consequences of those prior instructions are fully reflected in machine state. If a prior instruction takes a long time to execute then subsequent instructions simply wait for it to complete, a condition called stall. In the other approach, typically referred to as timed semantics, some fixed number (typically one) of instructions are begun every time period whether prior instructions have completed or not. On a wide issue machine, each instruction may contain several operations that issue together (when the instruction issues) but complete independently. Each operation sees only the consequences of prior operations that have actually completed. There may be other in-flight operations that have begun execution but not yet completed, and the effects of these in-flight operations are invisible. If a prior operation takes a long time to execute, then there may be many subsequent instructions executed before the lengthy operation's results are available.

Clearly if every instruction took exactly one time period to execute then the two approaches are the same in their effect. However, the natural execution time of different operations (called the latency) varies considerably in practice. Thus, a double-precision floating point multiply instruction may take ten times as many cycles to perform as does a simple integer add instruction.

Early instruction designs nearly always used sequential semantics because doing so simplified the hardware, despite the limit of doing only one instruction and its single operation at a time. Modern designs increase CPU complexity to be able to gain the ability to execute several operations in parallel, and so many designs (especially VLIW designs) use timed semantics.

Timed semantics instruction designs permit more than one operation to be executed in parallel. However, there are times when the program has no more operations to execute. For example, if a floating-point product is to be an argument of a function then the CPU cannot make the call until the product is ready, and there may not be anything else to do but wait. While an ability to wait is inherent in sequential semantics, in timed semantics the hardware expects to start an instruction every period, even when there's nothing to do. For this purpose, instruction sets with timed semantics always define a nop (no-operation) operation, which executes in one issue cycle and has no machine state consequences at all. The compiler or other instruction-generating software then fills any idle waiting periods with nop operations. Thus in the example, the actual instruction stream would contain the multiply operation, then some number of nop operations sufficient to let the multiply complete, and then the call.

The nop operation thus permits the benefit of timed semantics without a problem when there are not enough operations to fill necessary wait periods. The drawback to nop operations is that they must exist in the instruction stream and be processed as if they were useful, which costs memory and power.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a computer processor that processes distinct first and second instruction streams that have a predefined timed semantic relationship. At least one of the first and second instruction streams includes variable-length instructions having a header and associated bit bundle bounded by a head end and a tail end with an alignment hole within the bit bundle. The alignment hole encode information representing zero or more nop operations. The computer processor includes first and second multi-stage instruction processing components corresponding to the first and second instruction streams. The first and second multi-stage instruction processing components are configured to access and process in parallel instructions belonging to the first and second instruction streams stored in the memory system. At least one of the first and second multi-stage instruction processing components includes an instruction buffer operably coupled to a decode stage. The instruction buffer is configured to store at least one variable-length instruction, and the decode stage is configured to process the variable-length instruction stored by the instruction buffer by isolating and interpreting the alignment hole of the variable length instruction in order to initiate zero or more nop operations that follow the timed semantic relationship between the first and second instruction streams.

The alignment hole can have a variable location within the bit bundle. The variable-length instruction can have a header that does not specify the location of the alignment hole within the bit bundle.

The instruction buffer and the decode stage can be part of the first multi-stage processing component that accesses and processes the first instruction stream, where the decode stage is configured to interpret the alignment hole of the variable length instruction in order to initiate zero or more nop operations performed by the second multi-stage processing component in processing the second instruction stream.

The instruction buffer and the decode stage can also be part of the second multi-stage processing component that accesses and processes the second instruction stream, where the decode stage is configured to interpret the alignment hole of the variable length instruction in order to initiate zero or more nop operations performed by the first multi-stage processing component in processing the first instruction stream.

In one embodiment, the alignment hole of the variable length instruction can represent a nop count that is accumulated in a running counter maintained by the decode stage, wherein the running counter is updated according to decode cycles performed by the decode stage.

The alignment hole can be interpreted to initiate nop operations (stalls) in the current decode cycle or in a decode cycle that follows the current decode cycle.

In one embodiment, the first and second instruction streams can be part of a plurality of instruction blocks stored by a memory system. Each instruction block is associated with an entry address with the first and second instruction streams located within the instruction block. The first instruction stream has an instruction order that logically extends in a direction of increasing memory space relative to said entry address, and the second instruction stream has an instruction order that logically extends in a direction of decreasing memory space relative to said entry address. The first and second multi-stage instruction processing components are configured to access and process in parallel instructions belonging to the first and second instruction streams of a particular instruction block stored in the memory system. The first instruction stream can include instructions of a first class different from a second class of instructions in the second instruction stream in the same instruction block. The first multi-stage instruction processing component can be configured to process instructions belonging to the first class of instructions, and the second multi-stage instruction processing component is configured to process instructions belonging to the second class of instructions. For example, the first class of instructions can include instructions that perform flow-control operations and instructions that perform memory reference operations, and the second class of instructions can include instructions that perform computational operations.

The first and second multi-stage instruction processing component can each include a program counter, an instruction fetch unit, an instruction buffer, a decode stage and associated execution logic.

In one embodiment, the bit bundle includes a plurality of slots each defining a corresponding operation, wherein the plurality of slots and corresponding operations are logically partitioned into a plurality of distinct operation blocks with a first group of operation blocks extending from the head end of the bit bundle toward the tail end of the bit bundle and a second group of operation blocks extending from the tail end of the bit bundle toward the head end of the bit bundle. The second group of operation blocks includes a tail end operation block disposed adjacent the tail end of the bit bundle. The decode stage can be configured to process the variable-length instruction by decoding at least one operation of a particular operation block belonging to the first group of operation blocks in parallel with decoding at least one operation of the tail end operation block.

The alignment hole can be located between the first group of operation blocks and the second group of operation blocks. The decode stage can be configured to process the variable-length instruction by parsing and decoding operations for each one of the first group of operation blocks in a sequential block-by-block manner that follows the logical forward order of the first group of operation blocks, and parsing and decoding operations for each one of the second group of operation blocks in a sequential block-by-block manner that follows the logical reverse order of the second group of operation blocks. The decode stage can be further configured to process the alignment hole after parsing and decoding all of the first group of operation blocks and all of the second group of operations blocks.

DETAILED DESCRIPTION OF THE ILLUSTRATIVE EMBODIMENTS

Illustrative embodiments of the disclosed subject matter of the application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, the term "operation" is a unit of execution, such as an individual add, load, or control-flow operation.

The term "instruction" is a unit of logical encoding including a number of operations where all of the operations of the instruction are semantically performed together.

The term "slot" is a unit of logical encoding included within an instruction that is specific to an operation of the instruction.

The term "bundle" is a unit of physical encoding for the operations of an instruction. Thus, an instruction decoder receives a bundle to decode.

The term "operation block" in reference to the operations of a bundle is a unit of physical encoding for the operations of a grouping of one or more slots within the bundle of a given instruction. Thus, a bundle can include one or more operation blocks.

Figure 1A:
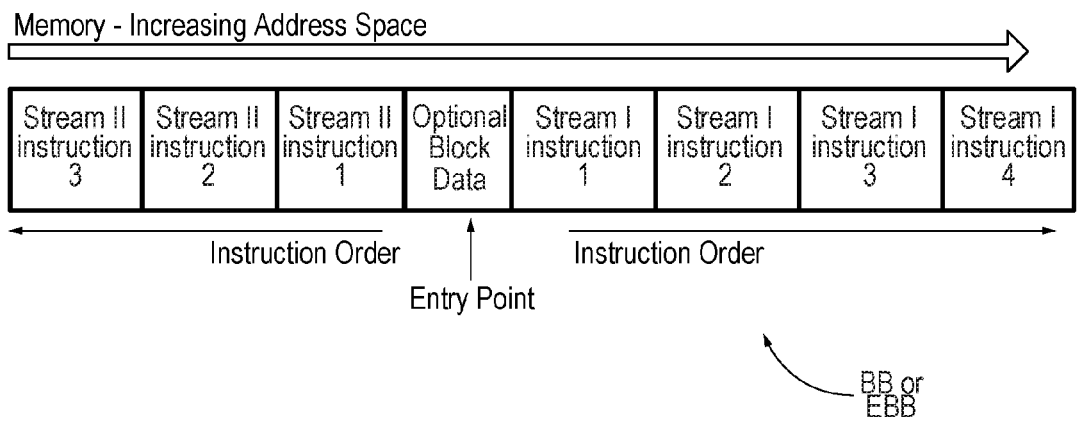
FIG. 1A is a schematic diagram of the logical organization of an instruction block according to an embodiment of the present disclosure, where the instruction block is loaded into the memory system of a computer processing system.
Figure 1B:
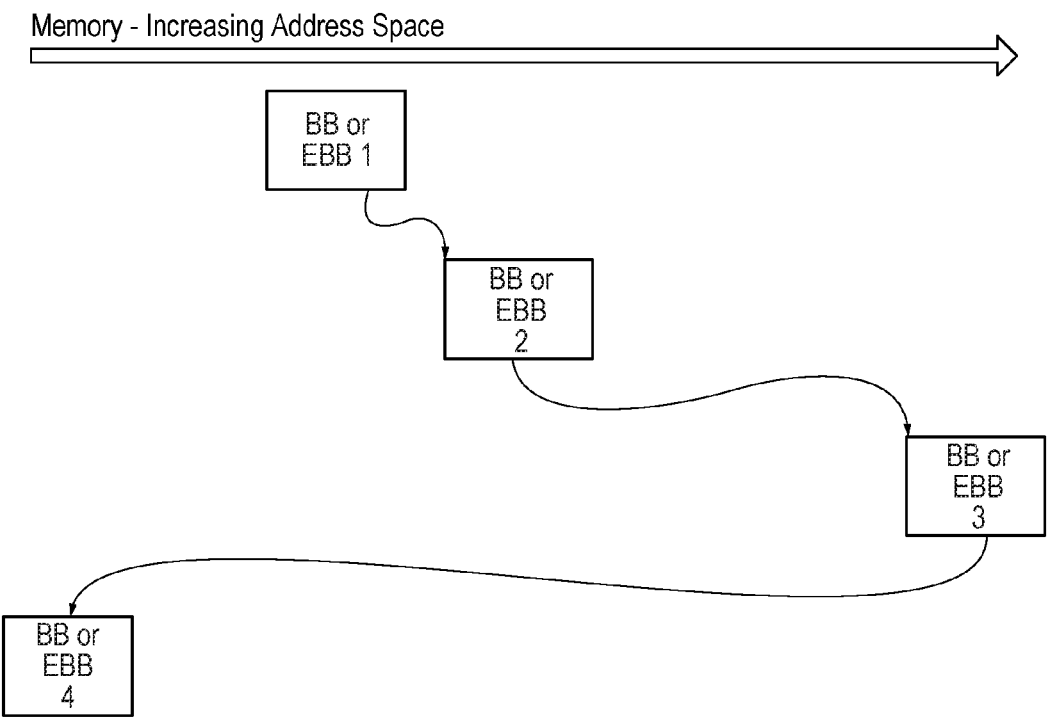
FIG. 1B is a schematic diagram illustrating a program represented by a sequence of instruction blocks of FIG. 1.

In accordance with the present disclosure, a program is loaded into and stored in a memory system as a set of instruction blocks within the memory system to be executed in logical sequence, not necessarily in memory sequence in either direction, as shown in FIGS. 1A and 1B. An entry point (or entry address) is associated with each instruction block. Each instruction block includes two distinct instruction streams that are labeled as "Stream I" and "Stream II" in FIG. 1A. Stream I includes a number of instructions (such as four instructions as shown) with an instruction order that logically extends in a direction of increasing memory space relative to the entry address of the instruction block. Stream II includes a number of instructions (such as three instructions as shown) with an instruction order that logically extends in a direction of decreasing memory space relative to the entry address of the instruction block. The stream I and the stream II instructions of the instruction block are entered at the entry address by a branch operation or other control-flow operation from some other instruction block or sequence, and will exit from the instruction block via another control-flow operation after executing some portion of the stream I and stream II instructions of the instruction block. An instruction block with one exit point (i.e., with one control-flow operation in the sequence of stream I and stream II instructions of the instruction block) is called a "basic instruction block" or "basic block" or BB. In this case, the one control-flow operation of the BB can be constrained to be part of the last instruction of the stream I or the stream II instructions of the BB. An instruction block with several possible exits point (i.e., with multiple control-flow operations in the sequence of stream I and stream II instructions of the instruction block) is called an "extended instruction block" or "extended basic block" or EBB. In this case, one of the multiple control-flow operations of the EBB can be constrained to be part of the last instruction of the stream I or the stream II instructions of the EBB.

Figure 1C:
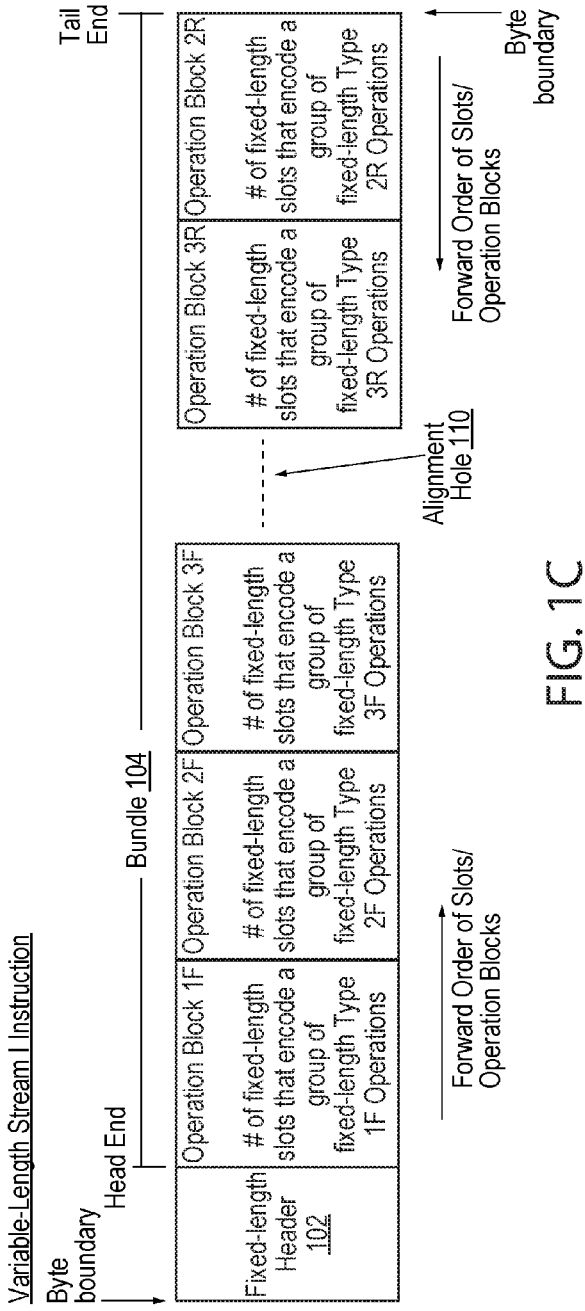
FIG. 1C is a schematic diagram of the logical organization of the stream I instructions of the instruction block of FIG. 1A.

The stream I instructions of the instruction block each have a format as shown in FIG. 1C, which includes a header 102 of fixed-length and an associated bundle 104 of variable-length that defines a number of operations or "opcodes." The bundle 104 includes a number of operation blocks (for example, up to four operation blocks labeled "1F", "2F", 3F", "3R" and "2R"), where each operation block encodes one or more operations in a variable number of slots. The slots and thus the opcodes for each given operation block have a predefined fixed bit-length, which can vary within the given operation block and can vary over the operation blocks. For illustration, consider one non-limiting example where Block 1F can have three slots (labeled 0, 1, 2) where the Block 1F slot 0 opcodes are always 11 bits in length, the Block 1F slot 1 opcodes are always 9 bits in length, and the Block 1F slot 2 opcodes are always 14 bits in length. While all the bit-lengths of the various slots and operations within Block 1F (or any other operation block in the bundle 104) may be the same, they are not necessarily the same. What is the same (or fixed) is for a particular slot within a particular operation block all operations have a fixed bit length. The bundle 104 has a head end 106 disposed opposite a tail end 108 as shown. The head end 106 is located at the first bit of the first slot of the bundle 104 (which is part of Block 1F in the instruction of FIG. 1C), while the tail end 108 is located at the last bit of the last slot of the bundle 104 (which is part of block 2R in the instruction of FIG. 1C). The operation blocks of the bundle 104 are further organized into two distinct groups of operation blocks: a forward group of operation blocks and a reverse group of operation blocks. The forward group of operation blocks extends from the head end 106 toward the tail end 108 (for example, Blocks 1F, 2F and 3F in the instruction of FIG. 1C). The reverse group of operation blocks extends from the tail end 108 toward the head end 106 (for example, Blocks 2R, 3R in the instruction of FIG. 1C). Thus, the slots and operation blocks of the forward group of operation blocks extend along a forward order, while the slots and operation blocks of the reverse group of operation blocks extend along a reverse order as shown in FIG. 1C. The forward group of operation blocks includes a head end block located adjacent the head end of the bundle 104, and the reverse group of operation blocks includes a tail end operation block located adjacent the tail end of the bundle 104. Both the header 102 and the tail end 108 of the bundle 104 can be aligned on byte boundaries with an offset 110 from zero to one less than the bit length of a byte between the forward group of blocks and the reverse group of blocks as shown. Moreover, the slots of each operation block and thus the operation blocks themselves are not necessarily byte sized or aligned on byte boundaries, which leads to an alignment hole 110. Thus, it is possible and likely that there will be an alignment hole 110 of one through seven bits between the forward group of operation blocks and the reverse group of operation blocks.

Note that the labeling of the blocks of the instructions in FIG. 1C include a two part identifier. The first part of the identifier (1 or 2 or 3) correspond to a logical order that the operation blocks can be processed in. In the event that more than one operation block shares a common first identifier, these operation blocks can be decoded in parallel with one another. The second part of the identifier (F or R) corresponds to the group (F for forward group and R for reverse group) that the operation blocks belong to. Thus, blocks 1F, 2F, and 3F belong to the forward group of operation blocks, and blocks 2R and 3R belong to the second group of operation blocks. Block 1F can be decoded first, followed by the decoding of Blocks 2F and 2R in parallel, followed by the decoding of Blocks 3F and 3R. Also note that there can be a wide variation in the arrangement of operation blocks in the bundle of the instruction. Examples of such variations include (1F, 2R), (1F, 2F, 2R), (1F, 2F, 3F, 2R), (1F, 2F, 3R, 2R), (1F, 2F, 3F, 3R, 2R of FIG. 1C), (1F, 2F, 3F, 4F, 3R, 2R) and so on.

Figure 1E:
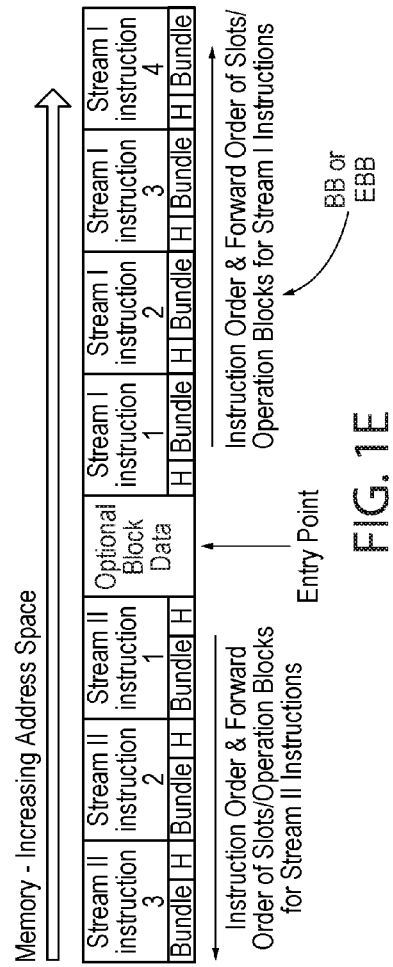
FIG. 1E is a schematic diagram of stream I and stream II instructions contained within an instruction block according to an embodiment of the present disclosure.
Figure 1D:
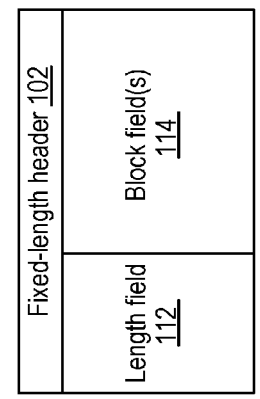
FIG. 1D is a schematic diagram of an exemplary embodiment of the header of the instruction of FIG. 1C.

As shown in FIG. 1D, the header 102 of the instruction encodes information related to the encoding of the instruction, including:
a length field 112, which encodes information related to the length of the instruction; and
one or more block fields 114, which encodes information related to the number of slots in the operation block(s) of the instruction.

The header 102 (and its contents) is placed at a fixed position in the instruction (though not necessarily at the beginning). Thus, the header as well as the opcode(s) of the first block of the forward group of operation blocks of the bundle 104 (i.e., the head end Block 1F in the instruction of FIG. 1C) can be accessed in the first decode cycle without otherwise examining the instruction contents. Note the location of the alignment hole 110 is variable within the bundle 104 (depending on the size of the forward group of operation blocks as well as the size of the reverse group of operations blocks) and is not specified by information in the header 102.

The stream II instructions of the instruction block have a format similar to the format of stream I instruction of FIGS. 1C and 1D with the forward direction of the forward group of operation blocks and the reverse direction of the reverse group of operation blocks flipped in the memory space as is evident from FIG. 1E.

Figure 2:
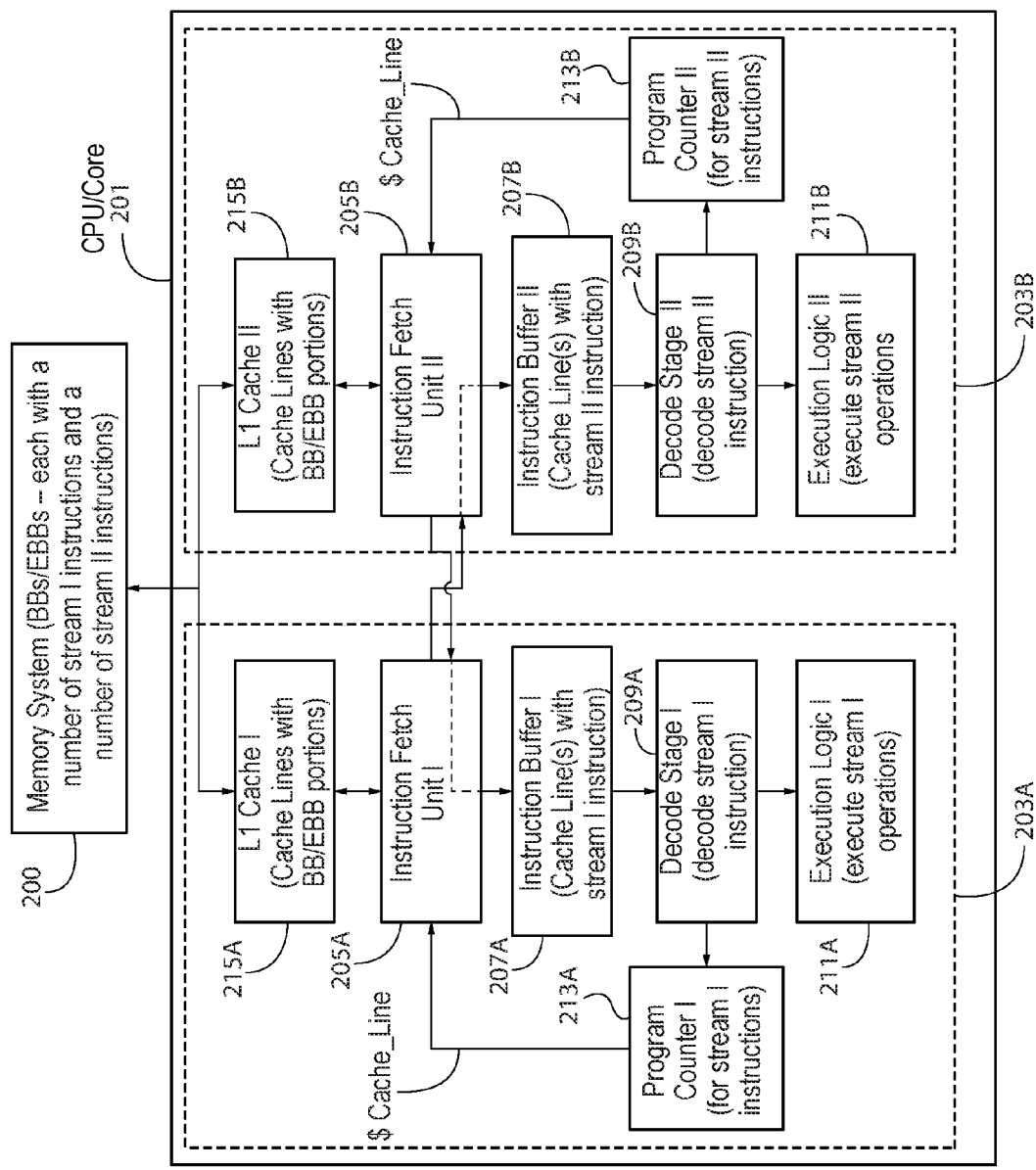
FIG. 2 is a schematic block diagram of a computer processing system according to an embodiment of the present disclosure.

The instruction blocks of FIG. 1E are stored in a memory system 200 and accessed and processed by a CPU(or Core) 201 as shown in the exemplary embodiment of FIG. 2. The CPU 201 includes two multi-stage instruction processing components 203A, 203B that operate to access and process in parallel the sequence of the two instruction streams I, II of particular instruction blocks stored in the memory system 200 according to the control flow defined by the execution of the instructions of the instruction blocks. In parallel-processing the two instruction streams I, II of a particular instruction block, the multi-stage instruction processing component 203A operates to access and process the instructions of the stream I for the particular instruction block while the multi-stage instruction processing component 203B simultaneously operates to access and process the instructions of the Stream II for the particular instruction block.

The multi-stage instruction processing component 203A includes a number of instruction processing stages (including an instruction fetch unit (labeled "Instruction Fetch Unit I", 205A), an instruction buffer (labeled "Instruction Buffer I", 207A), a decode stage (labeled "Decode Stage I", 209A) and execution logic (labeled "Execution Logic I", 211A)) that are arranged in a pipeline manner as shown. The multi-stage instruction processing component 203A also includes a program counter (labeled "Program Counter I" or "PC-I", 213A) and an L1 instruction cache (labeled "L1 Instruction Cache I", 215A).

The L1 instruction cache 215A is logically part of the hierarchy of the memory system 200. It is a cache that stores copies of instruction block portions stored in the memory system 200 in order to reduce the latency (i.e., the average time) for accessing the instruction block portions stored in the memory system 200. In order to reduce such latency, the L1 instruction cache 215A can take advantage of two types of memory localities, including temporal locality (meaning that the same instruction will often be accessed again soon) and spatial locality (meaning that the next memory access is often very close to the last memory access or recent memory accesses). The L1 instruction cache 215A can be organized as a set-associative cache structure, a fully associative cache structure, or a direct mapped cache structure as is well known in the art. The hierarchy of the memory system 200 can also include additional levels of cache memory, such as a level 2 and level 3 caches, as well as system memory. One or more of these additional levels of the cache memory can be integrated with the CPU 201 as is well known. The details of the organization of the memory hierarchy are not particularly relevant to the present disclosure and thus are omitted from the figures of the present disclosure for sake of simplicity.

The program counter 213A stores the memory address for a stream I instruction and thus indicates where the multi-stage instruction processing component 203A is in processing the sequence of stream I instructions in a given instruction block. The memory address stored in the program counter 213A can be used to control the fetching of stream I instructions by the instruction fetch unit 205A. Specifically, the program counter 213A can store the memory address for the stream I instruction to fetch. This memory address can be derived from a predicted (or resolved) target address of a control-flow operation, the saved address in the case of a return operation, or the sum of memory address of the previous stream I instruction and the length of previous stream I instruction. In some cases, the stream I instructions can be constrained such that they do not include control-flow operations. In this case, the memory address stored in the program counter 213A can be derived solely from the sum of memory address of the previous stream I instruction and the length of previous stream I instruction. The memory address stored in the program counter 213A can be logically partitioned into a number of high-order bits representing a cache line address ($ Cache Line) and a number of low-order bits representing a byte offset within the cache line for the stream I instruction.

The instruction fetch unit 205A, when activated, sends a request to the L1 instruction cache 215A to fetch a cache line from the L1 instruction cache 215A at a specified cache line address ($ Cache Line). This cache line address can be derived from the high-order bits of the program counter 213A (or possibly the program counter 213B in some circumstances). The L1 instruction cache 215A services this request (possibly accessing lower levels of the memory system if missed in the L1 instruction cache 215A), and supplies the requested cache line to the instruction fetch unit 205A. The instruction fetch unit 205A passes the cache line returned from the L1 instruction cache 215A to the instruction buffer 207A for storage therein. The instruction fetch unit 205A can also be configured to pass the cache line returned from the L1 instruction cache 215A to the instruction fetch unit 207B of the multi-stage instruction processing component 203B for storage in the instruction buffer 207B of the of the multi-stage instruction processing component 203B. The instruction fetch unit 205A can also be configured to receive a cache line returned from the L1 instruction cache 215B of the multi-stage instruction processing component 203B and pass the received cache line to the instruction buffer 207A for storage in the instruction buffer 207A.

The decode stage 209A of the multi-stage instruction processing component 203A is configured to decode one or more stream I instructions stored in the instruction buffer 207A. Such decoding generally involves determining the length of the stream I instruction, isolating one or more operation blocks of the stream I instruction bundle, and parsing and decoding the individual operation blocks to determine the type of operation(s) encoded by the block and generate control signals required for execution of the operations encoded by the block by the execution logic 211A. The parsing and decoding of an operation block can involve parsing the bits of the operation block into smaller slot-sized units according to the logical arrangement of slots within the operation block and decoding the operations of the units to generate control signals for execution of the operations of the operation block. The execution logic 211A utilizes the results of the decode stage 209A to execute the operations encoded by the one or more stream I instructions.

Similar to the multi-stage instruction processing component 203A, the multi-stage instruction processing component 203B includes a number of instruction processing stages (including an instruction fetch unit (labeled "Instruction Fetch Unit II", 205B), an instruction buffer (labeled "Instruction Buffer II", 207B), a decode stage (labeled "Decode Stage II", 209B) and execution logic (labeled "Execution Logic II", 211B)) that are arranged in a pipeline manner as shown. The multi-stage instruction processing component 203B also includes a program counter (labeled "Program Counter II" or "PC-II", 213B) and an L1 instruction cache (labeled "L1 Instruction Cache II", 215B).

The L1 instruction cache 215B is logically part of the hierarchy of the memory system 200. It is a cache that stores copies of instruction block portions stored in the memory system 200 in order to reduce the latency (i.e., the average time) for accessing the instruction block portions stored in the memory system 200. In order to reduce such latency, the L1 instruction cache 215B can take advantage of two types of memory localities, including temporal locality (meaning that the same instruction will often be accessed again soon) and spatial locality (meaning that the next memory access is often very close to the last memory access or recent memory accesses). The L1 instruction cache 215B can be organized as a set-associative cache structure, a fully associative cache structure, or a direct mapped cache structure as is well known in the art. The hierarchy of the memory system 200 can also include additional levels of cache memory, such as a level 2 and level 3 caches, as well as system memory as described above. The L1 instruction cache 215B can be of the same size as the L1 instruction cache 215A if the encodings and operations of the two instruction streams produce roughly similar demand for bytes. However, if the encoding and/or operations of the two instruction streams lead to imbalances demand for bytes, the two L1 instruction caches 215A, 215B can have different sizes. The larger one may have the same number of lines as the smaller but with a larger line size, or may have more lines of the same size. Which strategy will perform better in practice depends on the details of the demand and the structure of the hierarchy of the memory system 200.

The program counter 213B stores the memory address for a stream II instruction and thus indicates where the multi-stage instruction processing component 203B is in processing the sequence of stream II instructions in a given instruction block. The memory address stored in the program counter 213B can be used to control the fetching of stream II instructions by the instruction fetch unit 205B. Specifically, the program counter 213B can store the memory address for the stream II instruction to fetch. This memory address can be derived from a predicted (or resolved) target address of a control-flow operation, the saved address in the case of a return operation, or the sum of memory address of the previous stream II instruction and the length of previous stream II instruction. In some cases, the stream II instructions can be constrained such that they do not include control-flow operations. In this case, the memory address stored in the program counter 213B can be derived solely from the sum of memory address of the previous stream II instruction and the length of previous stream II instruction. The memory address stored in the program counter 213B can be logically partitioned into a number of high-order bits representing a cache line address ($ Cache Line) and a number of low-order bits representing a byte offset within the cache line for the stream II instruction.

The instruction fetch unit 205B, when activated, sends a request to the L1 instruction cache 215B to fetch a cache line from the L1 instruction cache 215B at a specified cache line address ($ Cache Line). This cache line address can be derived from the high-order bits of the program counter 213B (or possibly the program counter 213A in some circumstances). The L1 instruction cache 215B services this request (possibly accessing higher levels of the memory system if missed in the L1 instruction cache 215B), and supplies the requested cache line to the instruction fetch unit 205B. The instruction fetch unit 205B passes the cache line returned from the L1 instruction cache 215B to the instruction buffer 207B for storage therein. The instruction fetch unit 205B can also be configured to pass the cache line returned from the L1 instruction cache 215B to the instruction fetch unit 207A of the multi-stage instruction processing component 203A for storage in the instruction buffer 207A of the of the multi-stage instruction processing component 203A. The instruction fetch unit 205B can also be configured to receive a cache line returned from the L1 instruction cache 215A of the multi-stage instruction processing component 203A and pass the received cache line to the instruction buffer 207B for storage in the instruction buffer 207B.

The decode stage 209B of the multi-stage instruction processing component 203B is configured to decode one or more stream II instructions stored in the instruction buffer 207B. Such decoding generally involves determining the length of the stream II instruction, isolating one or more operation blocks of the stream II instruction, and parsing and decoding the individual operation blocks to determine the type of operation(s) encoded by the operation block and generate control signals required for execution of the operations encoded by the operation block by the execution logic 211B. The execution logic 211B utilizes the results of the decode stage 209B to execute the operations encoded by the one or more stream II instructions.

Note that the CPU 201 employ caches 215A, 215B to mitigate the delay in accessing the instruction blocks from the memory system 200. So long as an instruction block potion needed for execution of the program is located in the caches 215A, 215B, then the execution of the program will not be delayed by requesting instructions from the lower levels of the hierarchy of the memory system 200. However, if a needed instruction block portion is not in caches 215A, 215B, then the program must stall while it is accessed from the lower levels of the hierarchy of the memory system 200. Executed instructions are frequently re-executed in the near future, so any fetched from memory will also be placed in the cache for when next needed, replacing some other instruction that seems less likely to be needed soon.

The totality of instructions actually executed in a CPU over a brief period is called its working set. If the capacity of the cache is big enough to hold the working set, then the program can be executed with infrequent need to fetch instruction from memory with the concomitant delay. However, if the cache is smaller than the working set, then the instruction replaced by one fetched from memory will soon be needed again and have to be re-fetched, only to replace a different soon-needed instruction. This condition of endless instruction replacement, called thrashing, is well known. Thrashing can severely damage program performance. While thrashing can be somewhat ameliorated by reorganizing the program, the only real solution is a larger instruction cache, one large enough to hold the working set of the program. Unfortunately, large caches are expensive in chip area and power, and introduce extra delay in obtaining instructions from the cache. Balancing the need for larger instruction caches against their costs is an important consideration in designing a CPU. Note that for any given cache size and encoding there is a limit to the size of working set that can fit into a cache without thrashing.

In the instruction block organization of the present disclosure, instructions are organized into two or more disjoint instruction streams with each instruction stream having its own instruction cache. With multiple instruction caches and hence a large number of cache lines, the CPU 201 as described herein can ameliorate the thrashing problem by accommodating working sets that are much larger than can be handled by a single cache. And, unlike a very large single cache, the multiple caches do not incur extra delay for instruction access.

Moreover, the instruction streams are located adjacent in memory at the block entry point. Hence the cache line that contains the entry point will contain some leading fraction of both streams. In the CPU 201 described above, only a single copy of the entry cache line can be stored in one of the instruction caches of the CPU, while the entry cache line can be stored in multiple instruction buffers. Thereafter, the decoder stage for each respective instruction stream will fetch subsequent instructions from lines in its assigned instruction cache only, because only these lines contain instructions from the desired stream and not from the other steam. This eliminates duplication across the multiple caches.

The possible operations of an instruction set architecture of the processor 201 can be organized into groups of operations with the same length (and, generally similar use of functional units) while the group widths differ from each other with generally different functional requirements. For example, the operations can be grouped into six groups as follows: a first group for dyadic operations that take two operand addresses, a second group for triadic operations that take three operands, a third group for pure source operations that take a special register argument or similar argument but no ordinary operand arguments, a fourth group of pure sink operations that take one operand and a destination (such as a special register), a fifth group for flow-control operations, and a sixth group for memory access operations. Each of these groupings has their own execution functional requirements, which can be generally uniform within a group. For example, each compute dyadic operation needs a computation functional unit and the operand data paths to feed it, while each pure source operation needs a port into whatever is the source of data. The number of each kind of these resources is defined by the hardware of the execution logic 211A, 221B of the processor 201. Thus, these groupings can map (or correspond) to particular functional units of the execution logic 211A and of the execution logic 211B. For example, the first four group of operations can map to particular functional units of the execution logic 211A, while the last two groups of operations (the fifth and sixth groups) can map to particular functional units of the execution logic 211B.

Furthermore, the group of operations that are mapped to particular functional units of the execution logic 211A can be encoded within certain operation blocks of the stream I instruction that correspond to specific functional units of the execution logic 211A. In effect, each operation block of the stream I instruction defines a (wide) sub-instruction in the encoding whose length is constrained by the hardware of the execution logic 211A of the processor. For example, if the execution logic of the processor has only five computational pipelines for the group for dyadic operations that take two operand addresses, then the exemplary encoding can support only zero through five of such operations and no more, and similarly for the other groupings. Consequently, the encoding for each operation block consists solely of operations with identical or similar format, of known maximum number. Moreover, within an operation block only the operations of that format can exist, so it is not necessary to detect (by parse) whether some other kind of operation is present. Necessarily the encoding reflects the population of slots and of operations in each slot, and these can be varied by the design of the processor. In this configuration, where the operations of each given operation block all use the same format, each block can be decoded with a fixed-length decoding operation once it has been located and extracted from the bundle.

Similarly, the group of operations that are mapped to particular functional units of the execution logic 211B can be encoded within certain operation blocks of the stream II instruction that correspond to specific functional units of the execution logic 211B. In effect, each block of the stream II instruction defines a (wide) sub-instruction in the encoding whose length is constrained by the hardware of the execution logic 211B of the processor.

The operation block format of the stream I/II instructions can present a problem with regard to locating the operation blocks within the instruction. At the whole instruction level, each operation block can be thought of as a single variable width pseudo-operation within the instruction. That is, the instruction can be thought of as groups of pseudo-operations, each of which is of variable width. Consequently, at this level, the problem reduces to decoding the variable-width pseudo-operations of the instruction, or in other words to isolating the operation blocks. In one embodiment, the blocks or groups of pseudo-operations can be located within the instruction utilizing the block field(s) 114 of the header 102. In this case, the block field(s) 114 provide information that describe the number of slots for each pseudo-operation block in the particular instruction. Because (within each pseudo-operation block) the operations are of known length for each slot within the operation block, knowing how many there are also tells the length of the pseudo-operation block as a whole. This block length can be used to isolate each pseudo-operation block for fixed-width decoding of the opcode(s) contained in its slots.

This scheme can be extended further to take advantage of other aspects of the decoding process used. As described elsewhere, the header 102 also contains length field 112 that contains information (such as a byte count) related to the length of the whole instruction. As a result, the block field 114 for one of the pseudo-operation blocks can be omitted because it can be derived during decode from the slot counts of the other pseudo-operation blocks and the overall instruction length.

Moreover, the decode stages 209A, 209B can be configured to use the length field 112 of the header 102 of the respective instruction to quickly locate the tail end 106 of the bundle 104 and then decode the reverse group of operation blocks (starting with the slots of the operation block at tail end 106 of the bundle 104, such as Block 2R in FIG. 1C) in parallel with the decode of the first group of operation blocks (such as the Block 2F of FIG. 1C).

In the instruction formats described herein, there can be one or more timed semantic relationships between the stream I instructions and the stream II instruction of a given instruction block that relate to the manner that the stream I instructions and the stream II instruction of a given instruction block are decoded by the decode stages 209A, 209B and issued for execution by the execution logic 211A, 211B of the multi-stage instruction processing components 203A, 203B.

For example, the stream I instructions and the stream II instructions of the given instruction block can be decoded in a synchronous lock step manner, where one stream I instruction and one stream II instruction are taken as a matching pair that are synchronously decoded together.

In another example, the stream I instructions and the stream II instructions of the given instruction block can be decoded in a non-synchronous lock step manner where one stream I instruction or one stream II instruction is taken in an alternating manner according to some defined ratio and decoded in a non-synchronous manner with respect to one another.

In yet another example, the stream I instructions and the stream II instructions of the given instruction block can be decoded and issued for execution in a synchronous manner where there is not necessarily lock step coordination between the two instruction streams. In this example, the operations(s) of a stream I instruction of the given instruction block can issue together with the operations of a stream II instruction of the given instruction block, or the operation(s) of either the stream I instruction or the stream II instruction (but not both) of the given instruction block can issue together, or the issuance of operation(s) of either the stream I instruction and/or the stream II instruction of the given instruction block can be paused for some determined time.

In another example, the stream I instructions and the stream II instructions of the given instruction block can be decoded and issued for execution in an asynchronous manner where the stream I instructions and the stream II instructions are decoded and issued as efficiently as possible. In this case, the issuance of one of the instruction streams (i.e., "leading stream") can lead the issuance of the other instruction stream (i.e., the "lagging stream") and violate program semantics. In order to avoid this situation and preserve the program semantics, the leading stream can be paused until the lagging stream catches up.

In all of these examples, there is a potential semantic dependency between any instruction and any other instructions decoded and executed simultaneously or subsequently, and the details of such semantic dependencies vary according to the examples given above.

The decode stages 209A and 209B of the CPU 201 are controlled to follow the timed semantic relationships between the stream I instructions and the stream II instructions by interpreting nop operations that are encoded within the alignment hole of respective stream I instructions and stream II instructions. The alignment hole of the stream II instruction is shown in FIG. 1C. The stream II instructions have a similar alignment hole located between the forward and reverse group of operation blocks of the bit bundle of the stream II instruction. Specifically, the bits of the alignment hole specifies a count of implicit nop instructions. This mechanism for encoding nop instructions is more economical of space and processing than would be the case if they were encoded as ordinary operations.

The decode stage 209A interprets the bits of the alignment hole 110 in the stream I instruction in order to control stall operations performed by the decode stage 209B for stream II instructions. The stall operations of the decode stage 209B can involve disabling decode operations of stream II instructions and/or disabling issuance of the decode results to the functional units of the execution logic 211B. The timing of the stall operations of the decode stage 209B can be varied by design. For example, the stall operations of the decode stage 209B can be initiated in same cycle where the decode stage 209A interprets the bits of the alignment hole 110 in the stream I instruction. In this case, the decode stage 209B stalls in an immediate lock step manner with the decode of the corresponding stream I instruction. In another example, the stall operations of the decode stage 209B can be initiated in one or two or more subsequent cycles. In this case, the decode stage 209B stalls in a fixed delayed manner relative to the decode of the corresponding stream I instruction. This fixed delay can dictate the scheduling (insertion) of the nop operation as part of the stream I instruction stream in order to follow the time semantic relationship of the stream I and stream II instructions.

Similarly, the decode stage 209B interprets the bits of the alignment hole in the stream II instruction in order to control stall operations performed by the decode stage 209A for stream I instructions. The stall operations of the decode stage 209A can involve disabling decode operations of stream I instructions and/or disabling issuance of the decode results to the functional units of the execution logic 211A.

The timing of the stall operations of the decode stage 209A can be varied by design. For example, the stall operations of the decode stage 209A can be initiated in same cycle where the decode stage 209N interprets the bits of the alignment hole in the stream II instruction. In this case, the decode stage 209A stalls in an immediate lock step manner with the decode of the corresponding stream II instruction. In another example, the stall operations of the decode stage 209A can be initiated in one or two or more subsequent cycles. In this case, the decode stage 209A stalls in a fixed delayed manner relative to the decode of the corresponding stream II instruction. This fixed delay can dictate the scheduling (insertion) of the nop operation as part of the stream II instruction stream in order to follow the time semantic relationship of the stream I and stream II instructions.

In one embodiment, the bits of the alignment hole for the stream I instructions can represent a binary number that is added to a running stream I nop counter associated with the stream I instructions. In this case, the bits of the alignment hole for successive stream I instructions accumulate to specify a desired count of implicit nop instructions associated with the stream I instructions The stream I nop counter can be decremented following decode cycles of the decode stage 209A to follow the desired count. The decode stage 209A interprets the bits of the alignment hole in a stream I instruction to set or update the stream I nop counter and controls stall operations performed by the decode stage 209B for the decode cycles specified by the stream I nop counter until the stream I nop counter expires. Similarly, the bits of the alignment hole for the stream II instructions can represent a binary number that is added to a running stream II nop counter associated with the stream II instructions. In this case, the bits of the alignment hole for successive stream II instructions accumulate to specify a desired count of implicit nop instructions associated with the stream II instructions The stream II nop counter can be decremented following decode cycles of the decode stage 209B to follow the desired count. The decode stage 209B interprets the bits of the alignment hole in a stream II instruction to set or update the stream II nop counter and controls stall operations performed by the decode stage 209A for the decode cycles specified by the stream II nop counter until the stream II nop counter expires.

Of course, it can happen that the needed stall operations in either or both instruction streams exceeds the amount cycles that can be encoded in the alignment hole 110 of the instruction streams. This can be dealt with by some other mechanism, such as by an explicit lag-extension operation in one or both of the instruction streams or by inserting a non-elided no-op instruction.

Figure 3:
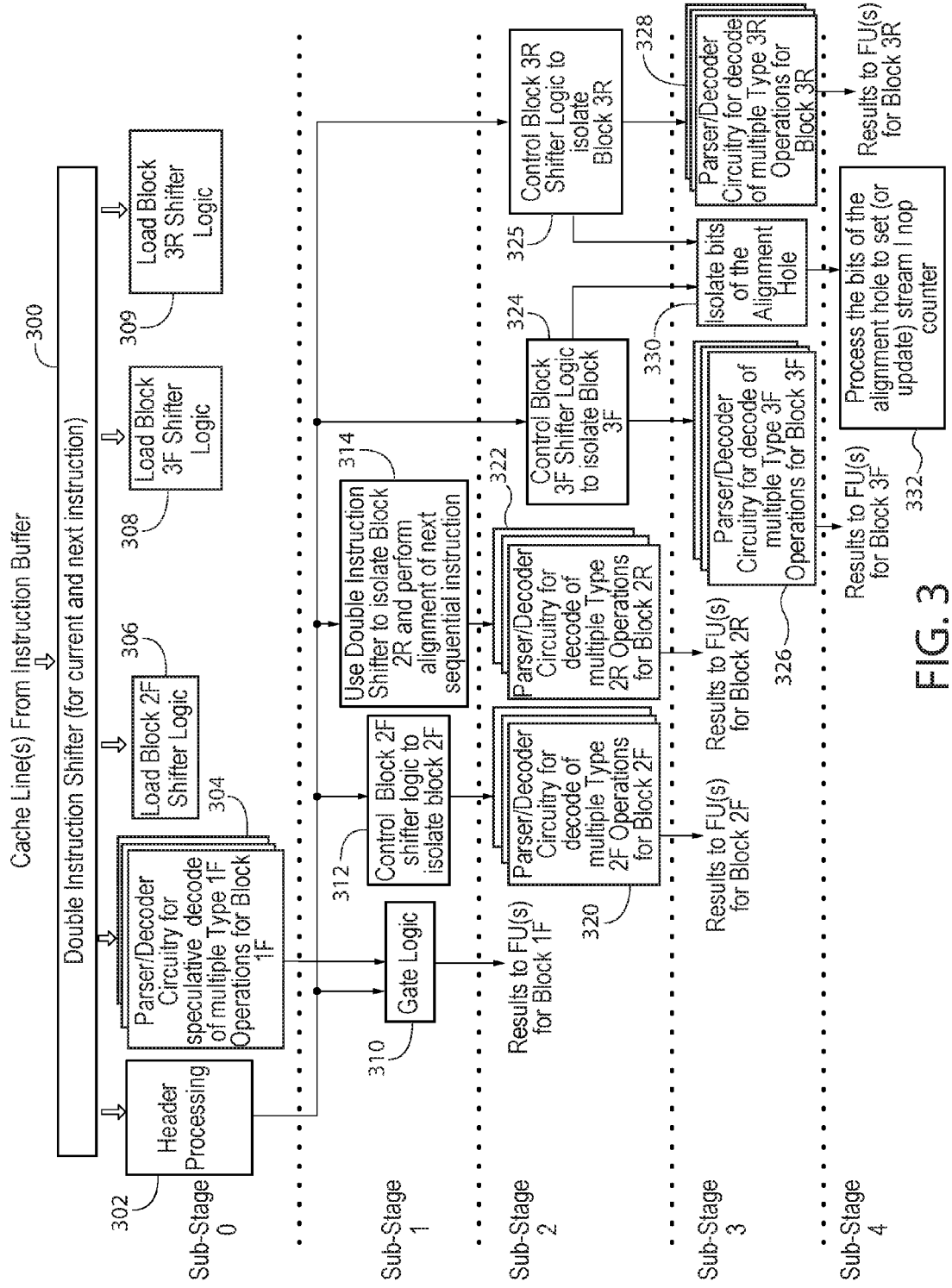
FIG. 3 is schematic diagram that illustrates exemplary operations carried out by the decode stage 209A of FIG. 2 in processing the stream I instructions of FIG. 1C as part of an instruction block of FIG. 1E.

FIG. 3 is a schematic diagram that illustrates an exemplary embodiment of the decode stage 209A of FIG. 2 for decoding a stream I instruction. The decode stage 209A assumes that the stream I instruction has been loaded into a double instruction shifter 300, which is configured to process two cache lines and shift the cache lines such that the current stream I instruction is aligned in the lower order bits of the double instruction shifter 300. This alignment operation can be performed as part of the instruction fetch process and thus conceptually can be part of the instruction buffer 207A. The decode stage 209A includes a number of sub-stages (for example, the five sub-stages labeled 0, 1, 2, 3 and 4) arranged in a parallel-pipelined configuration. Each sub-stage carries out a number of operations in a parallel manner as shown.

In sub-stage 0, header processing circuitry 302 operates on the header 102 of the current stream I instruction as supplied by the double instruction shifter 300 to process the length field 112 and the block fields 114 of the header 102. The header processing circuitry 302 uses the length field 112 of the header 102 as well as the block field 114 of the header 102 that relates to the number of slots in Block 2R of the current stream I instruction in order to derive control signals that are supplied the double instruction shifter 300 for use in 314 of sub-stage 1 as described below. The header processing circuitry 302 also uses the block field 114 of the header 102 that relates to the number of slots in Block 1F of the current stream I instruction in order to derive control signals that are supplied to the gate logic 310 for use in sub-stage 1 as described below. The header processing circuitry 302 also uses the block field 114 of the header 102 that relate to the number of slots in Block 2F of the current stream I instruction in order to derive control signals that are supplied to the Block 2F shifter logic for use in 312 of sub-stage 1 as described below. The header processing circuitry 302 also uses the block fields 114 of the header 102 that relate to the number of slots in Blocks 3F and 3R of the current instruction in order to derive control signals that are supplied to the block 3F shifter logic and to block 3R shifter logic for use in 324 and 325 in sub-stage 2 as described below.

Furthermore, in sub-stage 0, the maximum number of possible bits for opcodes of Block 1F of the current stream I instruction as stored in the double instruction shifter 300 are passed from the double instruction shifter 300 to an array of parser/decoder circuits 304. The array of parser/decoder circuits 304 is configured to perform speculative parsing and decoding on the supplied opcode bits for the predefined maximum number of slots and corresponding opcodes for Block 1F as constrained by the design of the instruction set architecture of the processor. The speculative parsing and decoding of Block 1F can involve parsing the bits of Block 1F into smaller slot-sized units according to the logical arrangement of slots within Block 1F and decoding the opcodes of the units to generate control signals for execution of the opcodes of Block 1F. The parsing and decoding operations are speculative in nature because the number of bits for the valid slots of Block 1F for the particular instruction are unknown. However, the alignment of the slots of Block 1F for the particular instruction is known (offset from the instruction address by the fixed-length of the header 102) and the pre-defined length of each Block 1F slot and corresponding opcode is also known. These constraints can be used to speculatively parse and decode the maximum number of slots for Block 1F, even though some of the slots are invalid.

Furthermore, in sub-stage 0, the bundle 104 for the current stream I instruction (or portions thereof) as stored in the double instruction shifter 300 is loaded into shifter logic for Block 2F (306) as well as into the shifter logic for Block 3F (308) as well as into the shifter logic for block 3R (309).

In sub-stage 1, the gate logic 310 is configured to use the control signals supplied by the header processing circuitry 302 to selectively pass (or ignore) the results of the speculative decode operations performed by the array of parser/decoder circuits 304 for supply (issue) to the functional units of the execution logic 209 that execute the opcodes of the slots of Block 1F in sub-stage 2. In this manner, the block field 114 of the header 102 that relates to the number of slots in Block 1F of the current stream I instruction is processed by the header processing circuitry 302 and the gate logic 304 such that only the decode results of valid slots within Block 1F are supplied (issued) to the functional units of the execution logic 209 that execute the operations of the slots of Block 1F, and the decode results for slots that are not part of Block 1F are ignored. The execution by the functional units of execution logic 209 can involve parallel execution of multiple opcodes in accordance with the valid results of the speculative decode operations output by the array 304.

Furthermore, in 314 of sub-stage 1, the double instruction shifter 300 is configured to use the control signals supplied by the header processing circuitry 302 in order to isolate and align the opcodes of Block 2R of the current stream I instruction. The opcodes of Block 2R of the current stream I instruction can be output from the double instruction shifter 300 in a format (such as a right-aligned format or other predefined format) suitable for processing by the array of parser/decoder circuits 322. The isolated bits of the opcodes for Block 2R of the current stream I instruction as output from the double instruction shifter 300 are loaded into the array of parser/decoder circuits 322 for processing in sub-stage 2 as described below. In controlling the operation of the double instruction shifter 300 in isolating the bits for the opcodes of Block 2R, the bit position for the one end of Block 2R that is adjacent the tail end of the envelope 104 can be derived from the length field 112 of the header 102, and the bit position for the other end of Block 2R that is adjacent Block 3R can be derived from the block field 114 of the header 102 that relates to the number of slots in Block 2R. Furthermore, the double instruction shifter 300 is configured to use the control signals supplied by the header processing circuitry 302 in order to perform bit shift operations that align the next sequential instruction within the lower order bits of the double instruction shifter 300. In this manner, the length field 112 of the header 102 that relates to the length of the instruction is processed by the header processing circuitry 302 to perform bit shifting operations that align the next sequential instruction within the double instruction shifter 300 (for supply to the header processing circuitry 302, decoder circuit array 304 and shifter logic 306/308/309 in the next cycle).

Furthermore, in sub-stage 1, the block 2F shifter logic (312) is configured to use the control signals supplied by the header processing circuitry 302 in order to isolate and align the opcodes of Block 2F of the current stream I instruction. The opcodes of block 2F of the current stream I instruction can be output from the block 2F shifter logic in a format (such as a left-aligned format or other predefined format) suitable for processing by the array of parser/decoder circuits 320. The isolated bits of the opcodes for block 2F of the current stream I instruction as output from the block 2F shifter logic are loaded into the array of parser/decoder circuits 320 for processing in sub-stage 2 as described below. In controlling the operation of the block 2F shifter logic in isolating the bits for the opcodes of Block 2F, the bit position for the one end of Block 2F that is adjacent block 1F can be derived from the block field 114 of the header 102 that relates to the number of slots in Block 2F and the fixed length of the header 102, and the bit position for the other end of Block 2F that is adjacent Block 3F can be derived from the block field 114 of the header 102 that relates to the number of slots in Block 2F.

In sub-stage 2, the array of parser/decoder circuits 320 is configured to perform parallel fixed-length parsing and decoding for each one of the opcodes (slots) of Block 2F represented by the bits passed from the block 2F shifter logic. The parsing and decoding of Block 2F can involve parsing the bits of Block 2F into smaller slot-sized units according to the logical arrangement of slots within Block 2F and decoding the opcodes of the units to generate control signals for execution of the opcodes of Block 2F. The results of such parallel fixed-length parsing and decode operations are output by the array 320 for supply (issue) to the functional units of the execution logic 209 that execute the opcodes of the slots of Block 2F of the current stream I instruction in sub-stage 3. The execution by the functional units of execution logic 209 can involve parallel execution of multiple opcodes of Block 2F in accordance with the results of the decode operations output by the array 322.

Furthermore, in sub-stage 2, the array of parser/decoder circuits 322 is configured to perform parallel fixed-length parsing and decoding for each one of the opcodes (slots) of Block 2R represented by the bits passed from the double instruction shifter 300. The parsing and decoding of Block 2R can involve parsing the bits of Block 2R into smaller slot-sized units according to the logical arrangement of slots within Block 2R and decoding the opcodes of the units to generate control signals for execution of the opcodes of Block 2R. The results of such parallel fixed-length parsing and decode operations are output by the array 322 for supply (issue) to the functional units of the execution logic 209 that execute the opcodes of the slots of Block 2R in sub-stage 3. The execution by the functional units of execution logic 209 can involve parallel execution of multiple opcodes of Block 2R in accordance with the results of the decode operations output by the array 322.

Furthermore, in sub-stage 2, the block 3F shifter logic (324) is configured to use the control signals supplied by the header processing circuitry 302 in order to isolate and align the opcodes of Block 3F of the current stream I instruction. The opcodes of Block 3F of the current stream I instruction can be output from the block 3F shifter logic in a format (such as a left-aligned format or other predefined format) suitable for processing by the array of parser/decoder circuits 326. The isolated bits of the opcodes for Block 3F of the current stream I instruction as output from the block 3F shifter logic are loaded into the array of parser/decoder circuits 326 for processing in sub-stage 3 as described below. In controlling the operation of the block 3F shifter logic in isolating the bits for the opcodes of Block 3F, the bit position for the one end of Block 3F that is adjacent Block 2F can be derived from the bit position of the adjacent end of Block 2F, and the bit position for the other end of Block 3F can be derived from the block field 114 of the header 102 that relates to the number of slots in Block 3F.

Furthermore, in sub-stage 2, the block 3R shifter logic (325) is configured to use the control signals supplied by the header processing circuitry 302 in order to isolate and align the opcodes of Block 3R of the current stream I instruction. The opcodes of block 3R of the current stream I instruction can be output from the block 3R shifter logic in a format (such as a right-aligned format or other predefined format) suitable for processing by the array of parser/decoder circuits 328. The isolated bits of the opcodes for Block 3R of the current stream I instruction as output from the block 3R shifter logic are loaded into the array of parser/decoder circuits 328 for processing in sub-stage 3 as described below. In controlling the operation of the block 3R shifter logic in isolating the bits for the opcodes of Block 3R, the bit position for the one end of Block 3R that is adjacent Block 2R can be derived from the bit position of the adjacent end of Block 2R, and the bit position for the other end of Block 3R can be derived from the block field 114 of the header 102 that relates to the number of slots in Block 3R.

In sub-stage 3, the array of parser/decoder circuits 326 is configured to perform parallel fixed-length parsing and decoding for each one of the opcodes (slots) of Block 3F represented by the bits passed from the block 3F shifter. The parsing and decoding of Block 3F can involve parsing the bits of Block 3F into smaller slot-sized units according to the logical arrangement of slots within Block 3F and decoding the opcodes of the units to generate control signals for execution of the opcodes of Block 3F. The results of such parallel fixed-length parsing and decode operations are output by the array 326 for supply (issue) to the functional units of the execution logic 209 that execute the opcodes of the slots of Block 3F. The execution by the functional units of execution logic 209 can involve parallel execution of multiple opcodes of Block 3F in accordance with the results of the decode operations output by the array 326.

Furthermore, in sub-stage 3, the array of parser/decoder circuits 328 is configured to perform parallel fixed-length decoding for each one of the opcodes (slots) of Block 3R represented by the bits passed from the block 3R shifter. The parsing and decoding of Block 3R can involve parsing the bits of Block 3R into smaller slot-sized units according to the logical arrangement of slots within Block 3R and decoding the opcodes of the units to generate control signals for execution of the opcodes of Block 3R. The results of such parallel fixed-length parsing and decode operations are output by the array 328 for supply (issue) to the functional units of the execution logic 209 that execute the opcodes of the slots of Block 3R. The execution by the functional units of execution logic 209 can involve parallel execution of multiple opcodes of Block 3R in accordance with the results of the decode operations output by the array 328.

Furthermore, in 330 of sub-stage 3, the bits of the alignment hole 110, if any, of the current stream I instruction are isolated. As shown in FIG. 1A, the alignment hole is located between the last operation block forward group of operation blocks (i.e., Block 3F in the example of FIG. 1C) and the last operation block of the reverse group of operation blocks (i.e., Block 3R in the example of FIG. 1C) of the stream I instruction. The alignment hole 110 can be isolated from the output of the block 3F shifter logic and/or the output of the block 3R shifter logic. Note that location of the alignment hole 110 is variable within the bundle 104 (depending on the size of the forward group of operation blocks as well as the size of the reverse group of operations blocks) and is not specified by information in the header 102. However, the bit position for the one end of the alignment hole adjacent Block 3F can be derived from the bit position of the adjacent end of Block 3F, and the bit position for the other end of the alignment hole adjacent Block 3R can be derived from the bit position of the adjacent end of Block 3R.

Finally, in 332 of sub-stage 4, the bits of the alignment hole as isolated in 330 are processed to set or update a running stream I nop-counter maintained by the decode stage 209A. In this embodiment, the bits of the alignment hole represent a binary number that is added to the running stream I nop counter, which can be decremented on decode cycle(s) performed by the decode stage 209A. Thus, the bits of the alignment hole for successive stream I instructions are accumulated by the running stream I nop counter to specify a desired count of implicit nop instructions, which is decremented in subsequent decode cycles of the decode stage 209A to follow the desired count. The decode stage 209A is further configured to initiate stall operations performed by the decode stage 209B for cycles specified by the stream I nop counter until the stream I nop counter expires.

In one embodiment, the output of the shifter logic circuits for each respective operation block in the instruction encoding (e.g., Blocks 1F, 2F, 3F, 3R, 2R) can be supplied over multiple taps (typically identified by tap numbers) that correspond to different logical shift operations (positions where the shift can start). Note that the length of the bundle in the decode stage 209A (the granularity) may not be the same as the byte length. For example, bundles of up to four two-byte operations need only four shifter taps, although the byte length may be as much as eight bytes. Moreover, each respective block shifter logic circuit can be the equivalent of an N-way multiplexer tree where N is the number of possible shifter tap numbers. In this case, the speed of each respective block shifter logic circuit is logarithmic in N and thus there is a limit to the number of different bundle lengths that can be shifted in one cycle. In practice this is not a constraint for up to 64 different bundle sizes. In this configuration, the block field(s) 114 of the header 102 can employ shifter tap numbers that relate to the number of slots in each respective block. These shifter tap numbers are processed and output to the block shifter circuits in order to isolate the respective operation blocks of the encoding. Similarly, the output of the double instruction shifter circuit can be supplied over multiple taps (typically identified by tap numbers) that correspond to different logical shift operations (positions where the shift can start). Thus, the length field 112 of the header 102 can employ a shifter tap number that relates to the total length of the instruction for use by the double instruction shifter in isolating the bits of Block 2R of the current stream I instruction and for use in aligning the bytes of the next instruction.

Note that similar operations as those described above with respect to FIG. 3 are performed by the decode stage 209B for stream II instructions. In these operations, the forward direction of the forward group of operation blocks and the reverse direction of the reverse group of operation blocks for the stream II instruction flipped in the memory space as is evident from FIG. 1E. Moreover, the decode stage 209B can be configured to isolate bits of the alignment hole, if any, that is located between the last operation block of the forward group of operation blocks and the last operation block of the reverse group of operation blocks of the stream II instruction. The bits of the alignment hole are processed to set or update a running stream II nop-counter maintained by the decode stage 209B. The bits of the alignment hole represent a binary number that is added to the running stream II nop counter, which can be decremented on decode cycle(s) performed by the decode stage 209A. Thus, the bits of the alignment hole for successive stream II instructions are accumulated by the running stream II nop counter to specify a desired count of implicit nop instructions, which is decremented in subsequent decode cycles of the decode stage 209B to follow the desired count. The decode stage 209B is further configured to initiate stall operations performed by the decode stage 209A for cycles specified by the stream II nop counter until the stream II nop counter expires.

In other embodiments, the alignment hole and the zero or more nop operations that are encoded therein can be used for instruction streams of other variable-length instruction formats, which can be decoded in a manner similar the instruction decoding mechanism described herein.

Note that the block format internal to a bundle can preclude certain shifter tap numbers for the blocks and the maximum shifter tap number is rarely a power of two which would fit naturally in a bit field in the header. Thus, there can be some left-over and unused shifter tap numbers. In one embodiment, certain ones of these unused shifter tap numbers can be used as part of the block field 114 of the header 102 to represent instructions with different formatting for the bit bundle and thus alternate encodings. To support such alternate encodings, the header processing circuit of the decode stage 207 can be configured to process (parse) the block field 114 of the header 102 to identify the specific shifter tap number corresponding to a given alternate encoding and enable decode circuitry that processes the alternate encoding of the bit envelop to generate appropriate control signals for execution of one or more operation represented by the alternate encoding in the execution logic 211A, 211B.

There have been described and illustrated herein several embodiments of a computer processor and corresponding method of operations. While particular embodiments of the invention have been described, it is not intended that the invention be limited thereto, as it is intended that the invention be as broad in scope as the art will allow and that the specification be read likewise. For example, the functionality of the CPU 101 as described herein can be embodied as a processor core and multiple instances of the processor core can be fabricated as part of a single integrated circuit (possibly along with other structures). It will therefore be appreciated by those skilled in the art that yet other modifications could be made to the provided invention without deviating from its spirit and scope as claimed.

What is claimed is:
1. A computer processor comprising:
   first and second multi-stage instruction processing components that are configured to access and process in parallel instructions belonging to the distinct first and second instruction streams that have a predefined timed semantic relationship, wherein at least one of the first and second instruction streams includes variable-length instructions having a bit bundle bounded by a head end and a tail end with an alignment hole within the bit bundle, wherein the alignment hole includes bits that specify a count of implicit nop operations that follows the timed semantic relationship between the first and second instruction streams;
   wherein first and second multi-stage instruction processing components each include an instruction buffer coupled to a decode stage, wherein the instruction buffer for a particular one of the first and second multi-stage instruction processing components is configured to store at least one variable-length instruction, and the decode stage for the particular one of the first and second multi-stage instruction processing components is configured to i) decode operations encoded by the variable-length instruction stored by the instruction buffer for the particular one of the first and second multi-stage instruction processing components, ii) isolate and interpret the bits of the alignment hole of the variable length instruction, and iii) initiate a number of nop operations as represented by the count of implicit nop operations specified by the bits of the alignment hole in order to follow the timed semantic relationship between the first and second instruction streams.
2. A computer processor according to claim 1, wherein:
   the alignment hole has a variable location within the bit bundle, and the variable-length instruction has a header that does not specify the location of the alignment hole within the bit bundle.
3. A computer processor according to claim 1, wherein:
   the instruction buffer and the decode stage of the first multi-stage processing component access and process the first instruction stream, wherein the decode stage of the first multi-stage processing component is configured to interpret the bits of the alignment hole of the variable length instruction and initiate a number of nop operations as represented by the count of implicit nop operations specified by the bits of the alignment hole which is performed by the second multi-stage processing component in processing the second instruction stream.

4. A computer processor according to claim 1, wherein:
the instruction buffer and the decode stage of the second multi-stage processing component access and process the second instruction stream, wherein the decode stage of the second multi-stage processing component is configured to interpret the bits of the alignment hole of the variable length instruction and initiate a number of nop operations as represented by the count of implicit nop operations specified by the bits of the alignment hole which is performed by the first multi-stage processing component in processing the first instruction stream.

5. A computer processor according to claim 1, wherein:
the count of implicit nop operations specified by the bits of the alignment hole is accumulated in a running counter maintained by the decode stage of the particular one of the first and second multi-stage instruction processing components, wherein the running counter is updated according to decode cycles performed by the decode stage of the particular one of the first and second multi-stage instruction processing components.

6. A computer processor according to claim 1, wherein:
the decode stage of the particular one of the first and second multi-stage instruction processing components is configured to interpret the bits of the alignment hole of the variable length instruction and initiate a number of nop operations as represented by the count of implicit nop operations specified by the bits of the alignment hole in the current decode cycle or in one or more cycles that follows the current decode cycle.

7. A computer processor according to claim 1, wherein:
the first and second instruction streams are part of a plurality of instruction blocks stored in a memory system, wherein each instruction block is associated with an entry address with the first and second instruction streams located within the instruction block, wherein the first instruction stream has an instruction order that logically extends in a direction of increasing memory space relative to said entry address, and the second instruction stream has an instruction order that logically extends in a direction of decreasing memory space relative to said entry address; and
the first and second multi-stage instruction processing components are configured to access and process in parallel instructions belonging to the first and second instruction streams of a particular instruction block.

8. A computer processor according to claim 7, wherein:
the first instruction stream comprises instruction of a first class different from a second class of instructions in the second instruction stream in the same instruction block;
the first multi-stage instruction processing component is configured to process instructions belonging to the first class of instructions; and
the second multi-stage instruction processing component is configured to process instructions belonging to the second class of instructions.

9. A computer processor according to claim 8, wherein:
the first class of instructions includes instructions that perform flow-control operations and instructions that perform memory reference operations; and
the second class of instructions includes instructions that perform computational operations.

10. A computer processor according to claim 1, wherein:
the first and second multi-stage instruction processing components each further include a program counter, an instruction fetch unit, and execution logic.

11. A computer processor according to claim 1, wherein:
the bit bundle includes a plurality of fixed-length slots, wherein the plurality of fixed-length slots are logically partitioned into a plurality of distinct blocks with a first group of blocks extending from the head end of the bit bundle toward the tail end of the bit bundle and a second group of blocks extending from the tail end of the bit bundle toward the head end of the bit bundle, wherein the second group of blocks includes a tail end e block disposed adjacent the tail end of the bit bundle, and wherein separate and distinct operations are encoded in the fixed-length slots of the first group of blocks and in the fixed-length slots of the second group of blocks; and
the decode stage of the particular one of the first and second multi-stage instruction processing components is configured to process the variable-length instruction by decoding at least one operation defined by a fixed-length slot of a particular block belonging to the first group of blocks in parallel with decoding at least one different operation defined by a fixed-length slot of the tail end block.

12. A computer processor according to claim 11, wherein:
the alignment hole is located between the first group of blocks and the second group of blocks.

13. A computer processor according to claim 12, wherein:
the decode stage of the particular one of the first and second multi-stage instruction processing components processes the variable-length instruction by parsing and decoding operations for the fixed-length slots of each one of the first group of blocks in a sequential block-by-block manner that follows the logical forward order of the first group of blocks, and parsing and decoding operations for the fixed-length slots of each one of the second group of blocks in a sequential block-by-block manner that follows the logical reverse order of the second group of blocks.

14. A computer processor according to claim 13, wherein:
the decode stage of the particular one of the first and second multi-stage instruction processing components is configured to process the alignment hole after parsing and decoding the operations for the fixed-length slots of all of the first group of blocks as well as the operations for the fixed-length slots of all of the second group of blocks.

15. A method comprising:
storing in a memory system distinct first and second instruction streams that have a predefined timed semantic relationship, wherein at least one of the first and second instruction streams includes variable-length instructions having a bit bundle bounded by a head end and a tail end with an alignment hole within the bit bundle, wherein the alignment hole includes bits that specify a count of implicit nop operations that follows the timed semantic relationship between the first and second instruction streams;
configuring first and second multi-stage instruction processing components of a computer processor to access and process in parallel instructions belonging to the first and second instruction streams stored in the memory system;
wherein the first and second multi-stage instruction processing components each include an instruction buffer coupled to a decode stage, wherein the instruction buffer for a particular one of the first and second multi-stage instruction processing components is configured to store at least one variable-length instruction, and wherein the decode stage for the particular one of the first and second multi-stage instruction processing components is configured to i) decode operations encoded by the variable-length instruction, ii) isolate and interpret the bits of the alignment hole of the variable length instruction, and iii) initiate a number of nop operations as represented by the count of implicit nop operations specified by the bits of the alignment hole in order to follow the timed semantic relationship between the first and second instruction streams.

16. A method according to claim 15, wherein:
the alignment hole has a variable location within the bit bundle, and the variable-length instruction has a header that does not specify the location of the alignment hole within the bit bundle.

17. A method according to claim 15, wherein:
the variable-length instruction is stored and processed by the instruction buffer and decode stage of the first multi-stage processing component as part of accessing and processing the first instruction stream, wherein the decode stage of the first multi-stage instruction processing component is configured to interpret the bits of the alignment hole of the variable length instruction and initiate a number of nop operations as represented by the count of implicit nop operations specified by the bits of the alignment hole which is performed by the second multi-stage processing component in processing the second instruction stream.

18. A method according to claim 15, wherein:
the variable-length instruction is stored and processed by the instruction buffer and decode stage of the second multi-stage processing component as part of accessing and processing the second instruction stream, wherein the decode stage of the second multi-stage instruction processing component is configured to interpret the bits of the alignment hole of the variable length instruction and initiate a number of nop operations as represented by the count of implicit nop operations specified by the bits of the alignment hole which is performed by the first multi-stage processing component in processing the first instruction stream.

19. A method according to claim 15, wherein:
the count of implicit nop operations specified by the bits of the alignment hole of the variable length instruction is accumulated in a running counter, wherein the running counter is updated according to decode cycles performed as part of the method.

20. A method according to claim 15, wherein:
the count of implicit nop operations specified by the bits of the alignment hole is interpreted to initiate a number of nop operations performed in a current decode cycle, or in a cycle that follows the current decode cycle.

21. A method according to claim 15, wherein:
the bit bundle includes a plurality of fixed-length slots, wherein the plurality of fixed-length slots are logically partitioned into a plurality of distinct blocks with a first group of blocks extending from the head end of the bit bundle toward the tail end of the bit bundle and a second group of blocks extending from the tail end of the bit bundle toward the head end of the bit bundle, wherein the second group of blocks includes a tail end block disposed adjacent the tail end of the bit bundle, and wherein separate and distinct operations are encoded in the fixed-length slots of the first group of blocks and in the fixed-length slots of the second group of blocks; and
the processing of the variable-length instruction involves decoding at least one operation defined by a fixed-length slot of a particular block belonging to the first group of blocks in parallel with decoding at least one different operation defined by a fixed-length slot of the tail end block.

22. A method according to claim 21, wherein:
the alignment hole is located between the first group of blocks and the second group of blocks.

23. A method according to claim 22, wherein:
the processing of the variable-length instruction involves parsing and decoding operations for the fixed-length slots of each one of the first group of blocks in a sequential block-by-block manner that follows the logical forward order of the first group of blocks, and parsing and decoding operations for the fixed-length slots of each one of the second group of blocks in a sequential block-by-block manner that follows the logical reverse order of the second group of blocks.

24. A method according to claim 22, wherein:
the alignment hole is processed after parsing and decoding the operations for the fixed-length slots of all of the first group of operation blocks as well as the operations for the fixed-length slots of all of the second group of operations blocks.

* * * * *